United States Patent Office 3,306,904
Patented Feb. 28, 1967

3,306,904
VAT DYESTUFFS OF THE ANTHRAQUINONE SERIES AND PROCESS FOR THEIR MANUFACTURE
Heinrich Sieber, Frankfurt am Main, Germany, assignor to Farbwerke Hoechst Aktiengesellschaft vormals Meister Lucius & Bruning, Frankfurt am Main, Germany, a corporation of Germany
No Drawing. Filed Oct. 23, 1964, Ser. No. 406,143
Claims priority, application Germany, Oct. 26, 1963, F 41,108
3 Claims. (Cl. 260—274)

The present invention relates to new valuable vat dyestuffs and to a process for preparing them; more particularly, the invention relates to vat dyestuffs of the formula

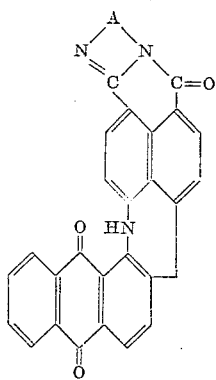

I in which A represents a substituted phenylene or naphthylene radical and the anthraquinone nucleus may carry further substituents, such as for example halogen atoms, alkyl, alkoxy or benzoylamino groups.

U.S. patent application No. 273,285, filed April 16, 1963, describes a process for preparing vat dyestuffs by condensing 4′,5′-dichloro- or 4′,5′-dibromo-1′,8′-naphthoylene-arylimidazoles or their substitution products with 1-amino-anthraquinones in the presence of an acid-binding agent and by heating the chlorine- or bromine-containing intermediate products in an acid amide which may be substituted at the nitrogen atom in the presence of an acid-binding agent and in the presence or in the absence of an organic solvent having a high boiling point to temperatures within the range from 150° to 270° C.

The very fast olive green to green vat dyestuffs obtainable according to the process disclosed in that application which, theoretically, may occur in the form of isomeric dyestuffs of the following formulae

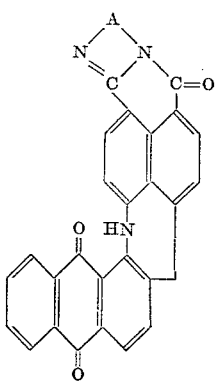

I and

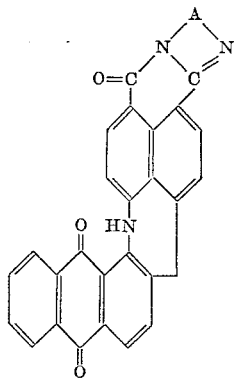

II wherein A represents a substituted or unsubstituted phenylene or naphthylene radical, have been found to correspond to the isomer of Formula II.

Now I have found that the isomeric vat dyestuffs which correspond to Formula I

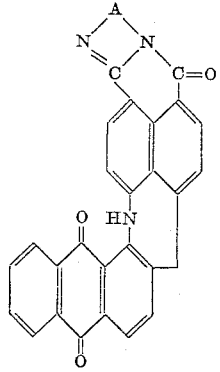

I wherein A represents a substituted or unsubstituted phenylene or naphthylene radical and the anthraquinone nucleus may contain substituents, such as for example halogen atoms, alkyl, alkoxy or benzoylamino groups, can be prepared by condensing 4′,5′-dichloro- or 4′,5′-dibromo-1′,8′-naphthoylene-arylimidazoles or their substitution products in the presence of organic solvents first with alkali metal phenolates or naphtholates and then with 1-aminoanthraquinones in the presence of an acid-binding agent and a copper salt and by treating the intermediate products obtained in an aqueous alkaline solution with sodium dithionite and in the presence of an organic acid amide at temperatures within the range from about 30° to 120° C.

The following reaction equations may serve to exemplify the reactions according to the process of the invention:

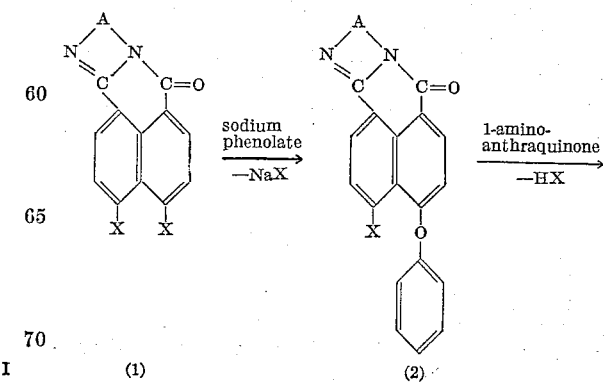

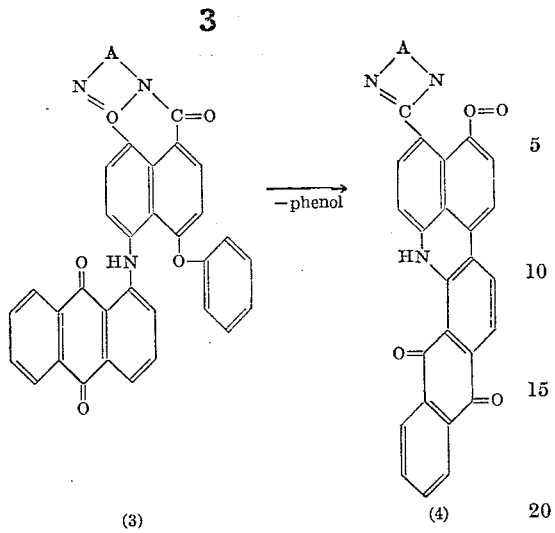

(In the formulae given above A has the meaning mentioned above and X represents a chlorine or a bromine atom.)

The dyestuffs obtainable according to the process of the present invention differ completely from the vat dyestuffs described in U.S. patent application No. 273,285, filed April 16, 1963, despite their similarity in shade. The dyestuff of the above Formula I which is obtained according to the process of the invention dyes cotton yellowish olive green shades, if A stands for the phenylene group. In contradistinction thereto, bluish olive green tints are obtained on cotton with the corresponding isomeric dyestuffs of the above Formula II. The most striking difference between the two dyestuffs consists in the color of their respective solutions in concentrated sulfuric acid. Whereas the dyestuff of Formula I dissolves with a clear blue color in sulfuric acid of 95% strength, the corresponding isomeric dyestuff of Formula II dissolves with a red violet color likewise in sulfuric acid of 95% strength. Moreover, the dyestuffs obtainable according to the invention are superior to the known dyestuffs as regards the fastness to light of the dyeings obtained with these dyestuffs on cotton. This proves clearly that the dyestuffs obtained according to the process of the invention are not identical with those obtained according to U.S. patent application No. 273,285 filed April 16, 1963.

The preparation of the dyestuffs is advantageously carried out by reacting 4',5'-dichloro- or 4',5'-dibromo-1',8'-naphthoylene-arylimidazoles or their substitution products of the above Formula 1, at an elevated temperature, first with the stoichiometric amount of an alkali metal phenolate or naphtholate, such as sodium or potassium phenolate, in an organic solvent as, for example dimethylformamide or nitrobenzene. The reaction temperature depends mainly on the starting compounds and the solvent used in each individual case. It is expedient to carry out the reaction at a temperature within the range from about 150° to 220° C. The reaction causes exchange of only one halogen atom, i.e., the halogen atom in a position adjacent to the carbonyl group. The intermediate products, which correspond to Formula 2, can be isolated in the usual manner and constitute yellow crystalline compounds. When the solvent used is nitrobenzene—as is expedient—the isolation is no longer necessary and the exchange of the second halogen atom can be effected in the same medium.

The reaction of the intermediate product of Formula 2 with 1-amino-anthraquinones is effected at a temperature within the range of about 150° to 200° C. in the presence of acid-binding agents, such as sodium or potassium carbonate or sodium or potassium acetate, and small amounts of a copper salt, as for example copper-I-chloride.

The anthrimides of the above Formula 3 which are obtained in a very good yield are easily converted—while splitting off the phenol or naphthol radical—into dyestuffs of Formula I. The cyclization is advantageously carried out by treating the anthrimides for some hours, at a temperature within the range from about 30° to 90° C., in an aqueous alkaline medium and in the presence of an organic acid amide, such as for example phosphoric acid tris-dimethyl-amide, N-methyl-pyrrolidone, benzamide or N-methyl-acetamide, with sodium dithionite. The dyestuffs which are obtained in the form of a vat can be precipitated by addition of sodium hypochlorite and are obtained in a form suitable for dyeing by filtration and washing.

The dyestuffs obtainable according to the process of the invention dye cotton green to yellowish green shades having a very good fastness to light. Moreover, the dyeings obtained on cotton with the use of these dyestuffs have excellent properties of wet fastness, especially a very good fastness to chlorine and to hydrogen peroxide.

The following examples serve to illustrate the invention but they are not intended to limit it thereto, the parts being by weight unless otherwise mentioned.

*Example 1*

A mixture consisting of 17.5 parts of the product obtained by condensation of 4,5-dichloronaphthalic acid with 1,2-diaminobenzene, 150 parts of nitrobenzene, 4.7 parts of phenol and 3.5 parts of potassium carbonate is heated for about 2 hours to 200° C. and reacted, after cooling to about 180° C., with 11 parts of 1-amino-anthraquinone, 4.5 parts of potassium carbonate and 0.2 part of copper I chloride.

The reaction mixture is then heated to the boil for about 5 hours. While cooling the condensation product precipitates in the form of crystals. It is filtered with suction, washed with methanol and water and dried at 100° C. The crude product which is obtained in a good yield melts at 320–324° C.

*Analysis.*—$C_{38}H_{2}O_{4}N_{3}$(M. 583)—Calc.: C, 78.3%; H, 3.6%; N, 7.2%. Found: C, 78.0%; H, 4.0%; N, 6.9%.

9 parts of the anthrimide mentioned above are suspended in 140 parts of water, and the suspension is then reacted with 40 parts by volume of a 22% sodium hydroxide solution, 30 parts of phosphoric acid trisdimethylamide and 20 parts of sodium dithionite.

The mixture is heated to the boil for 3 hours and mixed, after cooling, with 1000 parts of water and the amount of sodium hypochlorite solution required for precipitating the dyestuff formed. The dyestuff which has precipitated in a finely divided form is filtered with suction and washed with water until neutral. The dyestuff is obtained in a very good yield. It dissolves with a clear blue color in concentrated sulfuric acid and dyes cotton in a blue vat green shades. The dyeings obtained on cotton have excellent properties of wet fastness, particularly a very good fastness to chlorine and to hydrogen peroxide.

When using in the above example instead of 11 parts of 1-amino-anthraquinone 16.8 parts of 1-amino-4-benzoyl-amino-anthraquinone and proceeding for the rest as described above, a dyestuff is obtained which dyes cotton in a blue vat a greenish khaki shade. The dyeings obtained on cotton have excellent properties of wet fastness, above all a very good fastness to chlorine and to hydrogen peroxide, and an excellent fastness to light.

*Example 2*

150 parts of nitrobenzene are mixed with 22 parts of the product obtained by condensation of 4,5-dibromo-naphthalic acid anhydride with 1-methyl-3,4-diamino-benzene, 3.5 parts of anhydrous ground potassium carbonate and 4.7 parts of phenol and heated to the boil for about 2 hours.

After cooling to 180° C., 12 parts of 1-amino-anthraquinone, 4.5 parts of potassium carbonate and 0.2 part of copper I chloride are added and the whole is heated for 5 hours to 200–210° C. While cooling to 20° C. red brown crystals precipitate which are filtered with suction and washed with methanol and water. The anthrimide which is obtained in a good yield and pure state is then subjected to the ring closure reaction described in Example 1. The dyestuff which is obtained in a good yield dyes cotton a fast green shade which is slightly more yellowish than the dyeings obtained with the dyestuff described in Example 1.

A dyestuff with equally good properties is obtained when using in the above example instead of 22 parts of the product obtained by condensation of 4,5-dibromo-naphthalic acid anhydride with 1-methyl-3,4-diaminobenzene, 23.4 parts of the product obtained by condensation of 4,5-dibromo-naphthalic acid anhydride and 1-ethoxy-3,4-diaminobenzene.

*Example 3*

9 parts of the anthrimide obtained according to Example 1, 140 parts of water, 50 parts of a 22% potassium hydroxide solution, 30 parts of N-methylpyrrolidone and 20 parts of sodium dithionite are heated to the boil for 3 hours and the reaction mixture is then mixed with 1000 parts of water and an amount of sodium hypochlorite solution sufficient to precipitate the dyestuff completely. The suspension is filtered with suction and the filter cake washed with a dilute acid and with water. In order to remove the by-products the whole is washed with a small amount of dimethyl-formamide and finally with water until neutral. All the properties of the dyestuff obtained are identical with those of the dyestuff described in Example 1.

*Example 4*

22 parts of the product obtained by condensation of 4,5-dibromo-naphthalic acid with 1,2-diaminobenzene are suspended in 120 parts of nitrobenzene, then 4.7 parts of phenol and 3.5 parts of potassium carbonate are added to the suspension and the whole is heated for 2 hours to 200° C. After cooling to 180° C., 13 parts of 1-amino-6-chloro-anthraquinone, 4 parts of potassium carbonate and 0.2 parts of copper I chloride are added. The mixture is then heated to 200° C. and kept at this temperature for 5 hours. While cooling to 20° C. the anthrimide formed precipitates in the form of red brown crystals. It is filtered with suction, washed with methanol, dilute hydrochloric acid and water and dried at 100° C. The product is obtained in a very good yield.

9.5 parts of the anthrimide, 140 parts of water, 50 parts of a 22% sodium hydroxide solution, 30 parts of phosphoric acid tris-dimethylamide and 20 parts of sodium dithionite are heated for 3 hours to 40° C. After cooling, 1000 parts of water and a sodium hypochlorite solution are added to the reaction mixture until the dyestuff has completely separated. It is filtered, washed with water until neutral and dried. The dyestuff dyes cotton green shades having very good fastness properties.

I claim:
1. The dyestuff of the formula

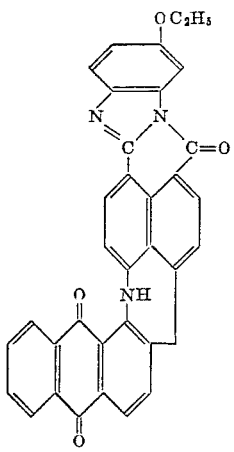

2. The dyestuff of the formula

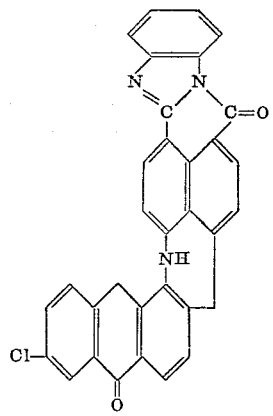

3. A process for preparing a dyestuff of the formula

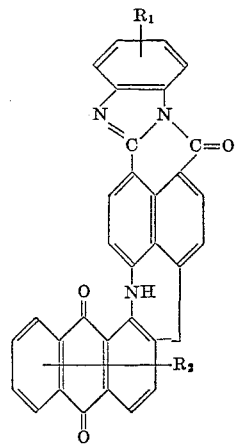

in which $R_1$ represents a member selected from the group consisting of a hydrogen atom, a lower alkyl group and a lower alkoxy group and $R_2$ represents a member selected from the group consisting of a hydrogen atom, a chlorine atom and a benzoylamino group, which comprises condensing a 4',5'-dihalogen-1',8'-naphthoylene-benzimidazole of the formula

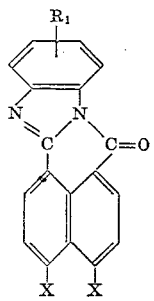

in which $R_1$ has the meaning given above and X represents a member selected from the group consisting of chlorine and bromine atoms in the presence of an organic solvent with an alkali metal phenolate and then with an aminoanthraquinone selected from the group consisting of 1-amino-anthraquinone, 1 - amino-benzoylamino-anthraquinone, and 1-amino-chloroanthraquinone in the presence of an acid-binding agent and a copper salt and treating the intermediates in an aqueous alkaline solution with sodium dithionite in the presence of an organic acid amide at a temperature between 30° and 120° C.

References Cited by the Examiner

UNITED STATES PATENTS

| | | | |
|---|---|---|---|
| 1,888,625 | 11/1932 | Eckert et al. | 260—282 |
| 1,973,787 | 9/1934 | Wolff | 260—274 |
| 2,023,479 | 12/1935 | Kunz et al. | 260—274 |
| 2,658,898 | 11/1953 | Adams et al. | 260—272 |

FOREIGN PATENTS

| | | |
|---|---|---|
| 399,724 | 10/1933 | Great Britain. |
| 753,185 | 10/1933 | France. |
| 421,264 | 12/1934 | Great Britain. |
| 443,958 | 2/1936 | Great Britain. |

WALTER A. MODANCE, *Primary Examiner.*

N. TROUSOF, *Assistant Examiner.*